United States Patent [19]

Sommer

[11] 4,434,508

[45] Feb. 28, 1984

[54] RADIO RECEIVER WITH AUDIO SELECTIVITY

[75] Inventor: Robert C. Sommer, Alexandria, Va.

[73] Assignee: American Systems Corporation, Annandale, Va.

[21] Appl. No.: 317,913

[22] Filed: Nov. 3, 1981

[51] Int. Cl.³ .............................................. H04B 1/12
[52] U.S. Cl. .................................. 455/306; 455/307; 455/312; 381/17; 381/71; 381/94
[58] Field of Search ..................... 179/1 D, 1 GP, 1 P; 455/149, 337, 306, 307, 312

[56] References Cited

U.S. PATENT DOCUMENTS

| 2,452,499 | 10/1948 | Siezen | 179/1 D |
| 2,474,191 | 6/1949 | Reid et al. | 179/1 D |
| 2,571,957 | 10/1951 | Singel | 455/337 |
| 2,616,970 | 11/1952 | Broos | 179/1 GP |
| 2,835,889 | 5/1958 | Dyer | 370/123 |
| 2,846,519 | 8/1958 | Morrell, Jr. | 179/1 GP |
| 3,311,833 | 3/1967 | Lewis et al. | 455/306 |
| 4,192,970 | 3/1980 | Kahn | 455/307 |

FOREIGN PATENT DOCUMENTS 53-38301  4/1978  Japan ............................. 179/1 GP

*Primary Examiner*—Marc E. Bookbinder
*Attorney, Agent, or Firm*—Anthony H. Handal

[57] ABSTRACT

A system is disclosed in which signals are presented to a listener with a spatial impression in which the signal which is desired appears to be coming from a source in front of the listener while other signals appear to be coming from audio sources to the right and left of the listener. The same is achieved through a combination of a heterodyne type detector and a combination of high pass and low pass filters receiving the output of the detector. The outputs of the high and low pass filters are separately amplified and each sent to one ear of the listener.

6 Claims, 5 Drawing Figures

RADIO RECEIVER WITH AUDIO SELECTIVITY

TECHNICAL FIELD

The invention relates to radio receivers exhibiting improved selectivity through the use of selective audio circuits.

BACKGROUND ART

Over the years, an increasing need for information transmitting media has resulted in a series of developments aimed at providing a more efficient utilization of available information bearing channels. Thus, once the basic problems involved in the generation of clean radio signals were solved in the early part of this century, development then turned toward more efficient techniques for separating the desired signal from a group of signals sharing the same general part of the spectrum.

In contrast to the first problem of generating a harmonically pure continuous wave signal or a harmonically pure carrier signal with sidebands extending from the carrier frequency within very well defined frequency limits, the problem of selecting desired frequency components of electrical signals has yet to be the object of an optimum solution. Generally, such techniques involve the use of conventional tuned circuits whose effectiveness is enhanced by reducing the carrier frequency by heterodyning techniques, regenerative feedback, or a combination of these techniques. In the case of heterodyning, reduction of the carrier frequency results in the possibility of designing a filter with a narrower passband with components having the same "Q" or quality factor. The quality factor is, a measure of the relationship between a manufactured electrical component, such as an inductor or capacitor, to an ideal component having no spurious resistive component. The quality factor of an electrical component may thus be expressed in terms of the ratio of reactance to resistance which, in turn, is proportional to the ratio of the frequency of a tuned circuit incorporating the component to the width of that circuit's passband. Thus, reducing the frequency of a radio signal to a lower frequency results in a passband which, in absolute terms, is fewer hertz in width for tuned components of a given Q.

Given these theoretical considerations, three basic techniques evolved for improving the quality factor of tuned circuit components. These involve decreasing the resistance of circuit components, increasing the reactive component of manufactured electrical parts and electronically removing resistance from the tuned circuit. The first of these approaches, namely, decreasing series resistances was relatively simple to overcome. This involved using relatively thick wire of high conductivity in winding inductors and using thick highly conductive plates in capacitors. Naturally, however, the physical size of components limited the extent to which this avenue of approach would yield useful results. The reactive component of an electrical element could, likewise, be increased without changing its series resistive components by, such techniques as incorporating a magnetic core in an inductor or using a material having a high dielectric constant, such a Mylar (a plastic film manufactured by the E. I. DuPont Company of Wilmington, Del.) instead of air. The third technique, the use of regenerative feedback, essentially comprises balancing the positive resistance inherent in all real electrical parts with a negative resistance generated by an electronic circuit. In principle, this technique, also known as Q-multiplication, as well as the others all have limits beyond which they cease to be useful.

As the principles involved in applying the above techniques were being refined, attention again focused on the generated signal. In particular, crowded conditions in the spectrum were dramatically alleviated through the use of single-sideband supressed carrier systems. In single-side band transmission, a conventional amplitude-modulated signal which comprises a carrier and two sidebands on opposite sides of the carrier is modified by the elimination of the carrier and one of the sidebands. This results in no loss of information, inasmuch as the second sideband contains a mirror image of the information in the other sideband and the carrier contains no information and may be generated at the receiving point. Presently, single-sideband transmission is very extensively used in areas where high fidelity is not required because of the efficiency with which it utilizes available band space.

Nevertheless, the readability of single-sideband signals is often impaired by interference from adjacent channels. In this respect, it is not unusual for relatively strong signals having frequencies higher and lower than that of the desired signal to be heard at the same time as the desired signal. While it is possible to reduce the interference from adjacent channels by increasing the selectivity of the receiver's tuned circuits, this also results in attenuating the high and low frequency components of the desired single sideband signal, thus resulting in distorted and often unintelligable signal reception.

DISCLOSURE OF THE INVENTION

In accordance with the present invention, the readability of a received signal is enhanced by providing carrier frequency information to the person listening to a receiver in a form which enables the listener to directly select desired portions of the frequency spectrum through a selection process independent of and in addition to selection functions being performed electronically in the receiver.

In the preferred embodiment, this is achieved by using a product detector as the demodulator. The output heterodyne products of the product detector are limited with respect to frequency, inasmuch as the detector receives its input from a filter circuit whose passband is tuned to pass signals predominantly in a range of frequencies on one side of the carrier frequency. The output of the product detector is passed to a pair of audio filters one of which is adjusted to pass predominantly those frequencies below the median frequency of the desired demodulated signal and the other filter designed to pass those frequencies in the output of the product detector which are predominantly higher in frequency than the median frequency of the desired signal. The outputs of these filters are, in turn, amplified by a two channel audio amplifier whose outputs are each coupled to one of the ears of the person listening to the receiver.

BRIEF DESCRIPTION OF THE DRAWINGS

The invention is described in detail below with reference to the drawings which illustrate only several specific embodiments, in which.

BEST MODE FOR CARRYING OUT THE INVENTION

Figure 1:
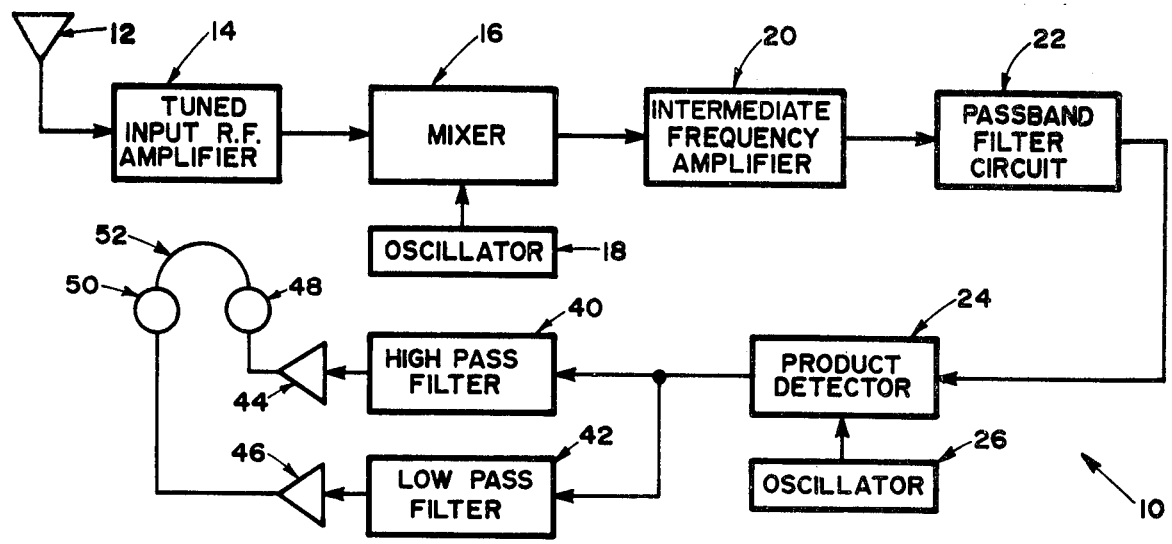
FIG. 1 is a block diagram of a radio receiver incorporating the invention.

Referring first to FIG. 1, a radio receiver 10 constructed in accordance with the present invention is illustrated. For purposes of illustration, the invention is shown in the environment of a receiver for receiving amplitude modulated, continuous wave or single sideband signals in the form of radio waves, however it will be understood that the invention may be used under other circumstances, for example, the reception of signals carried by a cable. As illustrated, radio waves are collected by an antenna 12 and sent to the input of the receiver which may typically be comprised of input amplifier circuitry 14. The output of this circuitry is, in turn, provided to a mixer 16 together with the output of an oscillator 18. The mixer mixes the two signals providing at its output the heterodyne products of the radio frequency signal provided by tuned input radio frequency amplifier 14 and the fixed frequency output of oscillator 18. The output of mixer 16 is coupled to intermediate frequency amplifier 20 which amplifies the output of the mixer and provides it to a passband circuit 22.

Passband circuit 22 has passband characteristics which allow it to pass only the signal which one desires to hear. For example, if the signal which one desires to hear is an amplitude modulated signal (or an upper sideband signal or a double sideband signal) containing audio information ranging between 300 and 3000 hertz and this signal is carried by a 10.455 MHz. carrier, oscillator 18 is selected to provide a 10 MHz sinusoidal output which, when mixed with the desired signal (which rides on a 10.455 MHz. carrier which may or may not be suppressed), results in a 455 KHz. signal at the output of the mixer, which signal is amplified by intermediate frequency amplifier 20 and sent to passband circuit 22.

Given these operating characteristics, passband filter circuit 22 is be selected to have a relatively flat passband in the range between 455.3 KHz. and 458.0 KHz. These frequencies, as a result of the operation of mixer 16, are the frequencies of the heterodyne products of the original input signal frequencies ranging between 10.4553 MHz. and 10.4580 MHz.

In most respects the processing of the radio signal as described up to this point is substantially similar to that in a conventional radio receiver. Naturally, if the received signal were a lower sideband signal, the passband of filter circuit 22 would be adjusted to pass the band of frequencies between three hundred cycles and three thousand hertz below 455 KHz. Likewise, if reduced fidelity is acceptable, the range of frequencies above or below the intermediate frequency of 455 KHz. may be reduced to between 500 and 2000 hertz above or below the intermediate frequency, or to any range which accomodates the frequency characteristics of the desired information bearing signals.

The output of passband filter circuit 22 is, in turn, coupled to the input of a product detector 24. Product detector 24 also receives the output of an oscillator 26 which produces an output signal having a frequency equal to that of the intermediate frequency which, in this example, is 455 KHz. Product detector 24 is, essentially, a mixer which multiplies the output of passband filter circuit 22 by the output of oscillator 24 to produce heterodyne products at its output. Thus, the output of product detector 24 includes, in the case of single sideband and double sideband signals, an audio signal having a frequency content substantially the same as the frequency content of the modulation information on the input signal received by antenna 12. However, because the response of passband filter circuit 22 is not perfect, signals received by antenna 12 and having frequencies in the range above 10.458 MHz. and below 10.4553 MHz. also appear at the output of product detector 24. Accordingly, if one were to amplify the output of product detector 24, signals on channels adjacent to that of the desired frequency will be heard by the listener.

Figure 2:
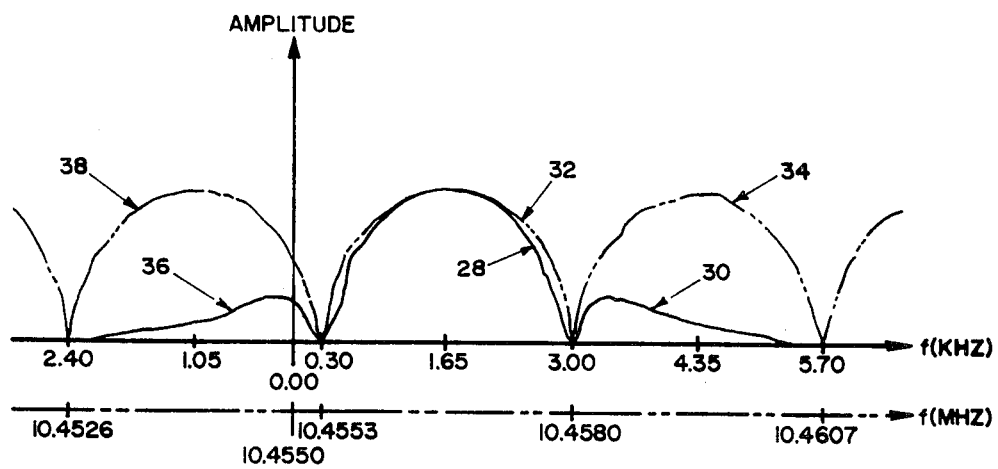
FIG. 2 is a diagram of signal amplitudes in the system of FIG. 1.

Some idea of the situation may be understood with reference to FIG. 2. The signal 28 which one desires to hear is shown in solid lines in FIG. 2. Because of the fact that passband filter circuit 22 is not ideal a signal 30 in the adjacent channel is also partially passed by the passband filter circuit. But for the filtering provided by filter circuit 22, signals 28 and 30 would appear unattenuated as signals 32 and 34, respectively, as illustrated in phantom lines in FIG. 2. Signals 32 and 34 thus correspond to the two upper sideband signals immediately appearing above 10.455 MHz. in the spectrum of signals captured by antenna 12. See the phantom line frequency scale in FIG. 2. Likewise, a third signal 36 passed by the filter corresponding to a signal 38 (which would represent a single sideband signal immediately below 10.455 KHz. in frequency), would also be presented by the output of product detector 24.

Thus, the listener in the case of a conventional receiver, would hear the signals illustrated in solid lines in FIG. 2.

In accordance with the present invention the output of product detector 24, which is illustrated in solid lines in FIG. 2, is passed through a pair of filters, including, a high pass filter 40 and a low pass filter 42. The output of these filters are, in turn, passed to amplifiers 44 and 46 respectively, which drive opposite earphones 48 and 50 respectively of headset 52.

In the illustrated system, the characteristics of the high pass and low pass filters 40 and 42 are such that high pass filter 40 passes those frequencies above 1650 Hz. with an attenuation of less than three decibels and low pass filter 42 passes those frequencies below 1650 Hz. with an attenuation less than three decibels. Thus, signal 30 appears predominantly at the output of the high pass filter and signal 36 appears predominantly at the output of the low pass filter. In contrast, significant portions of waveform 28 appear at the output of both high pass filter 40 and low pass filter 42.

In the case of a listener wearing headset 52, one of the listener's ears will receive the output of amplifier 44, which would include substantial portions of signal 28 and all of signal 30, while the other of his ears will be coupled to substantial portions of signal 28 and signal 36 via the output of amplifier 46. Thus, only signal 28 will have a substantial portion of energy in earphones 48 and 50 and, thus, be presented to both ears of the listener. Because of inherent correlative capacities of the human brain, the listener is able to utilize this selective transmission of signals to the right and left ear to mentally select signal 28 and block signals 30 and 36. Thus the interference caused by signals 30 and 36 may be reduced and the readability of signal 28 substantially enhanced.

In accordance with the preferred embodiment of the present invention, optimum operation of the system is achieved when the high pass and low pass filter possess certain characteristics. For purposes of this discussion we shall define $v_L$ as the voltage output of the lowpass filter 42 and $v_H$ as the voltage output of the highpass filter 40. The outputs of both of these filters must be complementary in order to maximize the readability of the desired output signal. To avoid coloration of the perceived signal 28, the filters are selected in such a manner that $v_L{}^2 + v_H{}^2$ remain invariant with variations in the input frequency to the filters. In other words, the sum of the output powers from the two filters should be frequency independent. Research has shown that the Butterworth filter characteristics provides this property when the half-power frequencies of the lowpass and highpass filters are made identical. If we define f as the frequency of the driving source and $f_c$ as the half-power frequency of the highpass and lowpass filters, we may define R as the ratio of f to $f_c$ or :

$$R = f/f_c$$

The n-pole Butterworth characteristic would then yield the following relationships for the squared magnitude of the normalized (i.e., unity bandwidth and unity magnitude) ideal lowpass filter:

$$|v_L|^2 = (1 + R^{2n})^{-1}$$

$$|v_H|^2 = (1 + R^{-2n})^{-1} = R^{2n}(1 + R^{2n})^{-1}$$

so that $$|v_L|^2 + |v_H|^2 = (1 + R^{2n})^{-1}(1 + R^{2n}) = 1$$

which shows that the sum of the output powers is a constant independent of R and, hence, independent of f.

It has also been found that the characteristics of the system vary in accordance with the relative phase between $v_L$ and $v_H$. In particular, it appears that optimum readability is obtained when $v_L$ and $v_H$ are in phase. In the case of the Butterworth characteristic, where n is the number of poles in the Butterworth filter, the two outputs are in phase for n=4, 8, 12, .... With n=2, 6, 10, ..., a phase inverter interposed between the output of $v_L$ and $v_H$ and the audio amplifier creates the desired phase relationship.

Figure 3:
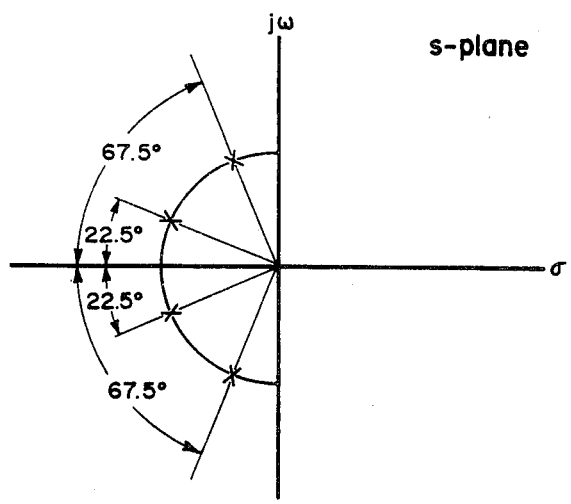
FIG. 3 is a diagram of the pole configurations of a filter useful in the system of the present invention.
Figure 4:
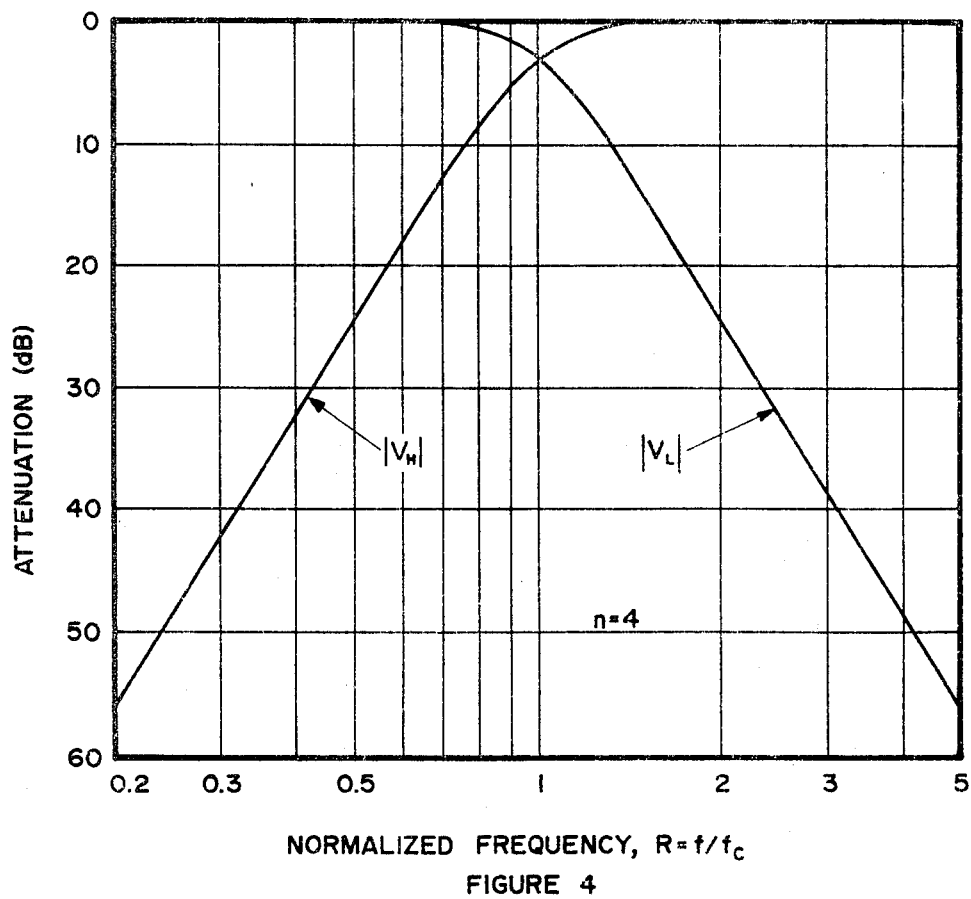
FIG. 4 is a graphic representing the response of the filter whose pole configurations is illustrated in FIG. 3.

In the case of n=1, 3, 5, ..., a quadrature relationship exists between the two outputs and this has been found to greatly impair the selection of that portion of the signal which is redundantly sent to both ears of the listener. The pole configurations for a Butterworth filter having four poles and the attenuation characteristics of such a filter are illustrated in FIGS. 3 and 4, respectively.

The above illustration in which the system incorporates a four pole Butterworth filter is particularly useful in applications involving the demodulation of voice signals. The relatively wide bandwidths involved in voice reception are in contrast to those involved in the reception of continuous wave or Morse code signals which are typically received with extremely narrow receiver passbands. This is possible because the bandwidth of such signals is very narrow. Consequently, in a band of frequencies containing Morse code signals, adjacent signals and, accordingly, all of the interference is spectrally located relatively close to the desired signal. Under these circumstances, in employing the system of the present invention, a relatively large value of n is desirable. From the above equation defining the n-pole Butterworth characteristics, it can be seen that the ratio of output powers from the highpass and lowpass filters is:

$$|v_r|^2 = |v_L|^2/|v_H|^2 = R^{-2n}(1+R^{2n})(1+R^{2n})^{-1}$$

$$|v_r|^2 = R^{-2n} = (f/f_c)^{-2n}.$$

Converting to decibels:

$$|v_r|^2 = -20n\ [\log_{10} f - \log_{10} f_c]\ \text{dB}.$$

The derivative of this quantity with respect to frequency represents a sensitivity factor, S, which is determined to be:

$$S = d/df(v_r{}^2)\ \text{dB} = (20n/f)(1n10) = 8.686\ n/f\ \text{dB/Hz}.$$

From this equation it can be seen that the change in $v_L/v_H$ measured in decibels per Hertz of frequency change is proportional to n and inversely proportional to f. Therefore to obtain a relatively well defined separation of signals between the left and right earphones of the listener with signals that are closely packed spectrally, a relatively large value of n in the Butterworth characteristic is required. It is expected that designs involving Butterworth characteristics with n equal to 4 and 8 will be the most valuable commercially. Values of n greater than or equal to 10 will yield even better results for the reception of closely packed signals however the added advantage to be obtained with such a design must be balanced against the very precise component values required to properly implement such filter designs.

Figure 5:
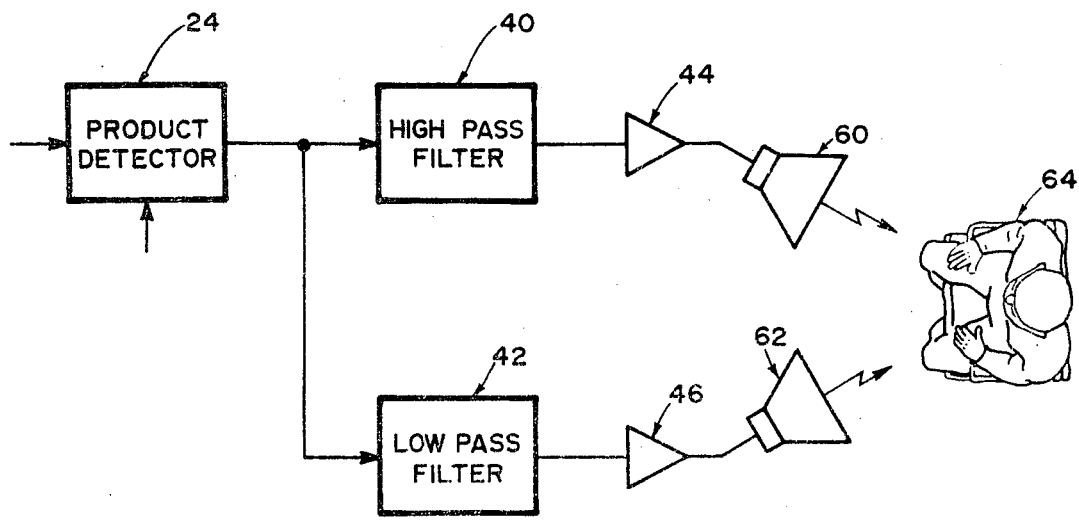
FIG. 5 is a schematic diagram of an alternative embodiment of the system of the present invention.

Turning to FIG. 5, an alternative embodiment of the present invention is illustrated. In particular, instead of passing the output of highpass filter 40 and lowpass filter 42 to a headset 52 via amplifiers 44 and 46, the output of the filters 40 and 42 are, instead, sent to a pair of speakers 60 and 62 via amplifiers 44 and 46, respectively. Speakers 60 and 62 and positioned at opposite sides of the listener in such a manner that the right ear of listener 64 prredominantly hears the output of speaker 60 and the listener's left ear hears predominantly the output of the speaker 62. Thus the listener is able to concentrate on those signals which appear in both his left and right ear simultaneously with the proper phase relationship to mentally block undesired signals.

While a specific embodiment of the invention has been described, it is understood that various modifications of the disclosed structure will be obvious to those of ordinary skill in the art. Such modifications are within the spirit and scope of the invention which is limited and defined only by the appended claims.

I claim:

1. A system for detecting a desired signal on a desired channel accompanied by a plurality of undesired signals on a plurality of adjacent channels, each signal comprising a carrier signal with information modulated thereon, each of said carrier signals being of different frequency, comprising:

(a) means for supplying the desired and undesired signals (b) oscillator means for generating an oscillation signal having a frequency at or near the carrier frequency of said signal;

(c) bandpass means responsive to said supplying means for providing an output composite signal comprising said desired signal and undesired signal components attenuated with respect to said desired signal;

(d) mixer means for heterodyning said composite signal and the output of said oscillator means to produce a mixer output signal, said output signal being the heterodyne products of said oscillator signal with said desired signal and said undesired signal components, respectively, the product of said oscillator signal and said desired signal occupying a desired range of frequencies in the audio range;

(e) first filter means having a first cutoff frequency for receiving the output of said mixer means and passing signals whose frequency is below said first cutoff frequency;

(f) second filter means having a second cutoff frequency for receiving the output of said mixer means and passing signals whose frequency is above said second cutoff frequency, said first and second cutoff frequencies being substantially near the center of said desired range;

(g) first coupling means for passing the output of said first filter means as a first audio signal containing signals with frequencies below said desired range with amplitudes greater than signals above said desired range;

(h) second coupling means for passing the output of said second filter means as a second audio signal containing signals with frequencies above said desired range with amplitudes greater than signals with frequencies below said desired range;

(i) transducer means for providing said first audio signal to one ear of a listener and said second audio signal to the other ear of said listener.

2. A system as in claim 1 wherein said first filter is a lowpass filter and said second filter is a highpass filter whereby said system is capable of operating on single sideband, double sideband, amplitude modulated and Morse code signals.

3. A system as in claim 2 wherein the sum of the output powers from said lowpass filter and said highpass filter is substantially independent of frequency.

4. A system as in claim 3 wherein said first and second cutoff frequencies are equal and the output of said highpass filter and lowpass filter are in phase with each other.

5. A system as in claim 4 wherein said highpass filter and said lowpass filters are both four-pole Butterworth filters.

6. A system as in claim 3 wherein the output of said first filter means and said second filter means are in phase with each other.

* * * * *